United States Patent [19]
Tuttlebee

[11] Patent Number: 6,006,000
[45] Date of Patent: Dec. 21, 1999

[54] COMPOSITE RIBBON COUPLING CABLE FOR ROTARY COUPLING APPARATUS

[75] Inventor: Roger Tuttlebee, Stanground, United Kingdom

[73] Assignee: Hubbell Incorporated, Orange, Conn.

[21] Appl. No.: 09/024,449

[22] Filed: Feb. 17, 1998

[51] Int. Cl.$^6$ ....................................................... G02B 6/44
[52] U.S. Cl. ......................... 385/114; 385/106; 385/112; 385/100
[58] Field of Search .................................... 385/100, 103, 385/105, 106–114, 134, 135

[56] References Cited

U.S. PATENT DOCUMENTS

| | | | |
|---|---|---|---|
| 5,542,019 | 7/1996 | Pascher | 385/114 X |
| 5,651,082 | 7/1997 | Eoll | 385/114 |

OTHER PUBLICATIONS

Fiber Optic Rotary Connector, 4 pages by Stemmann—Technik GmbH of Schuttorf, Germany No Month, No Date.
Nova Scotia Slip Rings, 6 pages, by Focal Technologies Inc of Dartmouth, Nova Scotia, Canada No Month No date.

*Primary Examiner*—Phan T. H. Palmer
*Attorney, Agent, or Firm*—Jerry M. Presson; Michael R. Swartz

[57] ABSTRACT

A composite ribbon coupling cable includes a plurality of elongated strengthening elements made of a resilient springy material, a plurality of elongated communications elements disposed in alternating spaced apart relation with the elongated strengthening elements, an inner jacket of insulative material encapsulating the alternating strengthening elements and communications elements therewithin so as to dispose the encapsulated elements in a substantially common plane providing a substantially flat ribbon configuration, and an outer jacket of resilient wear-resistant protective material encapsulating the inner jacket of insulative material. The strengthening elements preferably are elongated bands of a spring metal whereas the communications elements preferably have fiber optic cores or copper cores. The inner jacket includes a pair of inner flat layers of insulative material disposed along and adhered to opposite sides of the alternating strengthening elements and communications elements. The outer jacket includes a pair of outer flat layers of wear-resistant protective material each disposed along and adhered to an outer surface of one of the inner flat layers of the inner jacket of insulative material.

17 Claims, 3 Drawing Sheets

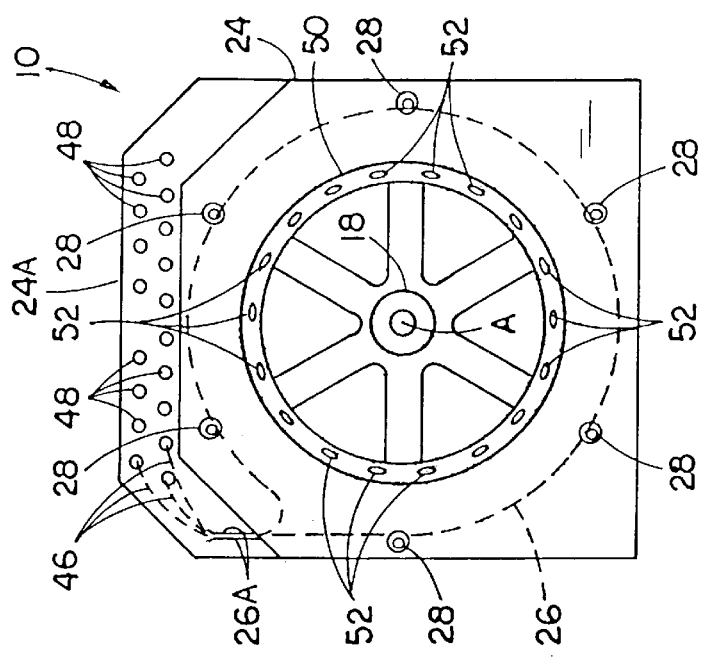
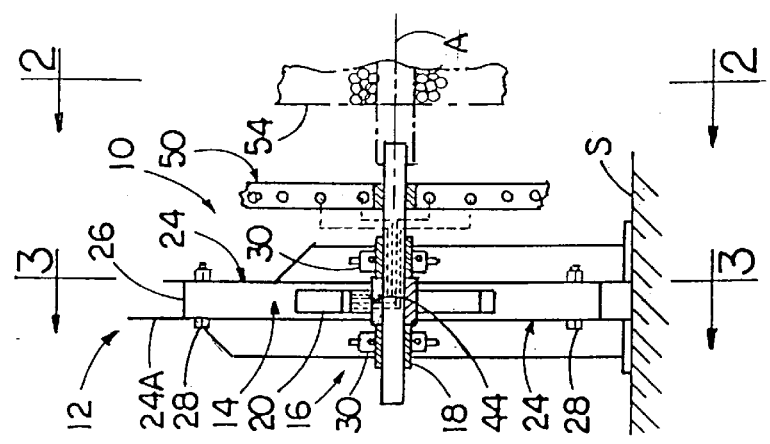
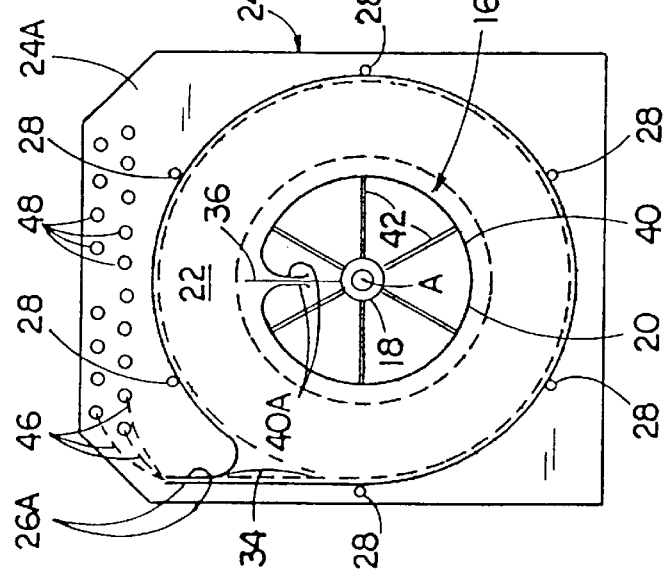

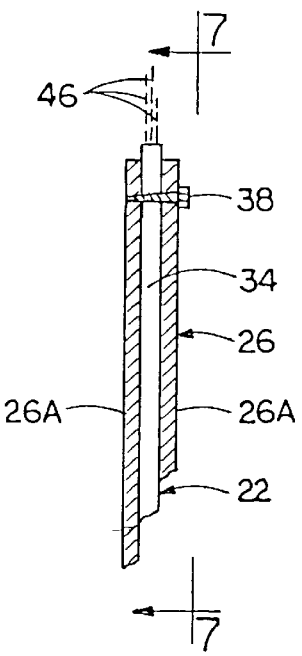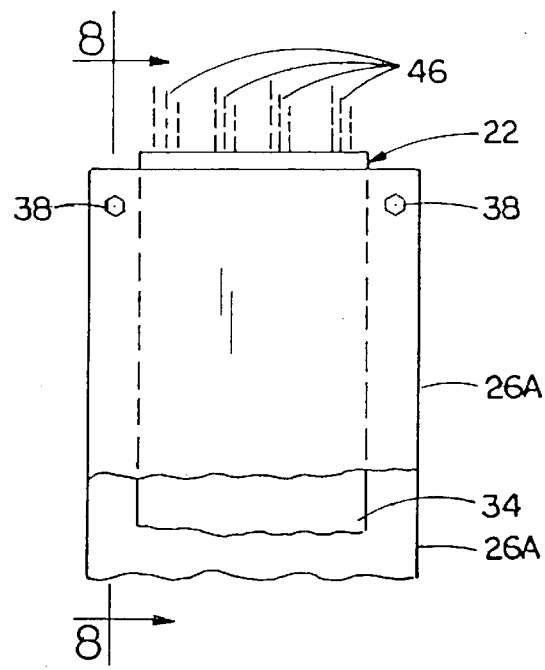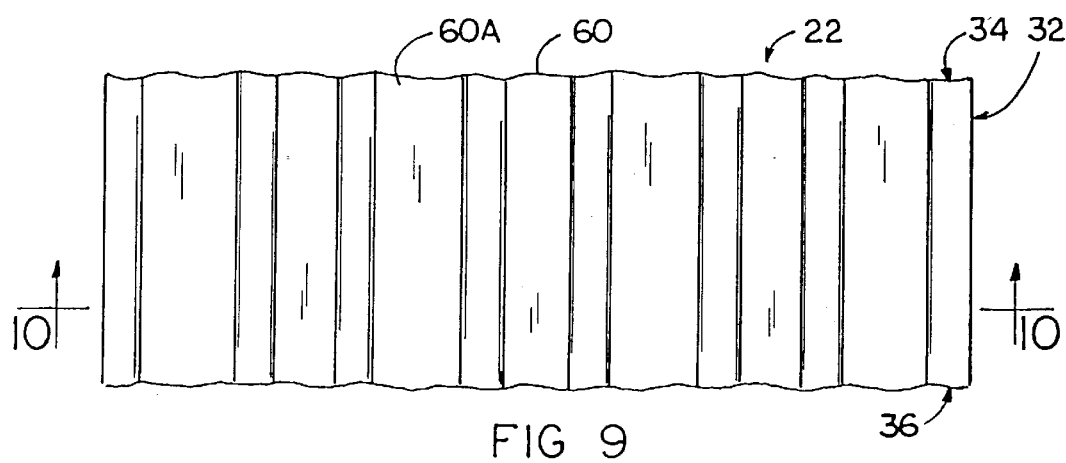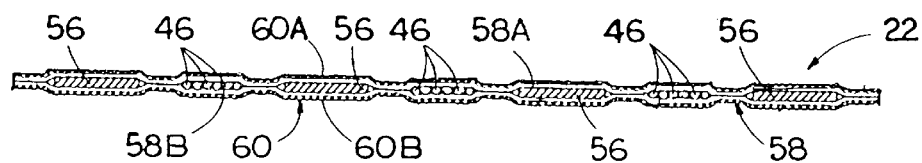

COMPOSITE RIBBON COUPLING CABLE FOR ROTARY COUPLING APPARATUS

CROSS-REFERENCE TO RELATED APPLICATION

Certain subject matter disclosed in this application relates to the invention claimed in a copending patent application entitled "Rotary Coupling Assembly For Transmission Cables", designated U.S. Ser. No. 09/024,448 filed Feb. 17, 1998, which is assigned to the same assignee as this application.

BACKGROUND OF THE INVENTION

1. Field of the Invention

The present invention generally relates to transmission cables and, more particularly, is concerned with a composite ribbon coupling cable for use in an apparatus providing rotary coupling between stationary and rotatable parts of transmission cables.

2. Description of the Prior Art

In many industries in general there is increasing use of computer technology to control the operation of machines and the movement of products. In many instances, such use of computer technology requires high quality transmission networks. Within the container shipping industry in particular there is increasing tendency towards tracing cargo by using computer technology. The achievement of computerized cargo traceability requires the use of high quality fiber optics in data transmission networks.

The data transmission cables, together with the power supply cables, of such networks have to be managed in some way when connected to moving machinery. Since the power supply cables are typically handled by the use of rotatable cable reels, it would then seem to readily follow that the transmission cables could be easily handled by placing them on the rotatable reels with the power cables. However, unlike the electricity being transmitted on power supply cables which can be "collected" by using slipring and brushgear assemblies, the bands of light in fiber optics have to be transmitted as a continuous unbroken beam. Effective transmission of continuous unbroken beams of light between stationary and rotating parts of transmission cables is thus more complicated than merely placing the transmission cables on the rotatable reels with the power cables.

Heretofore, the continuous transmission of light beams through fiber optics having relative rotating parts has been achieved using one of two methods. The first method involves the use of an optical rotary joint but this method is limited to a low number of passes through the cable. With respect to a single pass the optical joint is relatively straightforward, economical and reliable; but for two or more passes the joints become highly sophisticated in their optical engineering and are very expensive. However, the joints do have the advantage of being capable of rotating in either direction indefinitely. Several models of a device employing this first method are manufactured by Focal Technologies Inc. of Dartmouth, Nova Scotia, Canada.

The second method involves the use of some kind of transfer mechanism whereby a continuous length of fiber optic cable is wound and unwound from adjacent spools as a central shaft rotates. The winding and unwinding of the cable is such that it eliminates twisting of the cable. This type of device is limited to the relatively small number of rotations that can take place in one direction before it has to be reversed. Several models of a device employing this second method are manufactured by Stemmann-Technik GMBH of Schuttorf, Germany, and by Specimas Spa of Nova Milanese, Italy.

Consequently, a need exists for improvements which overcome the limitations of the aforementioned prior art devices without introducing any new limitations in their place.

SUMMARY OF THE INVENTION

The present invention provides a composite ribbon coupling cable designed to satisfy the aforementioned needs. The composite ribbon coupling cable of the present invention is employed in the rotary coupling apparatus so as to reliably interconnect the stationary and rotatable parts of the transmission cables and enable computer or telecommunications data to be transmitted therebetween.

Accordingly, the present invention also is directed to a composite ribbon coupling cable which comprises: (a) a plurality of elongated strengthening elements made of a resilient springy material, a plurality of elongated communications elements with at least some of the elongated strengthening elements and communications elements being disposed in alternating spaced apart relation with one another, an inner jacket of insulative material encapsulating the alternating strengthening elements and communications elements therewithin so as to dispose the encapsulated elements in a substantially common plane providing a substantially flat ribbon configuration, and an outer jacket of resilient wear-resistant protective material encapsulating the inner jacket of insulative material. The strengthening elements are elongated bands of a spring metal. The communications elements can be fiber optic cores or copper cores. The inner jacket includes a pair of inner flat layers of insulative material disposed along and adhered to opposite sides of the alternating strengthening elements and communications elements. The outer jacket includes a pair of outer flat layers of wear-resistant protective material each disposed along and adhered to an outer surface of one of the inner flat layers of the inner jacket of insulative material.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is an axial sectional view of a rotary coupling apparatus comprising the invention of the patent application cross-referenced above.

FIG. 2 is a front elevational view of the apparatus as seen along line 2—2 of FIG. 1.

FIG. 3 is an elevational view of the apparatus taken along line 3—3 of FIG. 1 with an unwindable and windable flat coupling cable employed in the apparatus being omitted.

FIG. 7 is an enlarged fragmentary view of a clamp securing an end of the coupling cable as seen along line 7—7 of FIG. 8.

FIG. 8 is a cross-sectional view of the clamp securing the coupling cable taken along line 8—8 of FIG. 7.

FIG. 9 is an enlarged fragmentary plan view of the coupling cable in the form of a composite ribbon coupling cable of the present invention.

FIG. 10 is a cross-sectional view of the composite ribbon coupling cable.

DETAILED DESCRIPTION OF THE INVENTION

Figure 5:
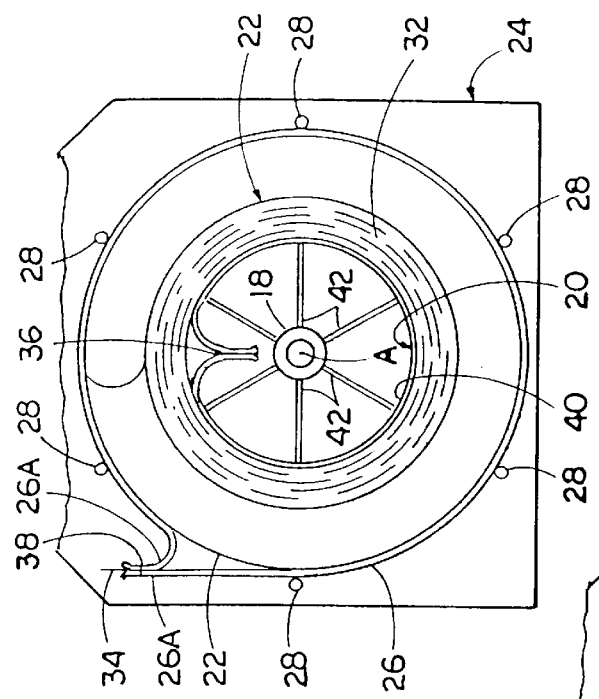
FIG. 5 is an elevational view similar to that of FIG. 4 but showing the coupling cable substantially fully wound in a clockwise direction on the rotary drum of the apparatus.

In the following description, like reference characters designate like or corresponding parts throughout the several views. Also in the following description, it is to be understood that such terms as "forward," "rearward," "left," "right," "upwardly," "downwardly," and the like, are words of convenience and are not to be construed as limiting terms.

Rotary Coupling Apparatus

Referring now to the drawings, and particularly to FIGS. 1 to 8, there is illustrated the rotary coupling apparatus, generally designated 10, comprising the invention of the patent application cross-referenced above. The rotary coupling apparatus 10 can be used with various types of transmission cables. By way of example, the type of transmission cables illustrated in the drawings can be conventional fiber optic cables or conventional electrical cables.

The rotary coupling apparatus 10 basically includes a stationary housing 12 defining a chamber 14, an elongated rotatable member 16 in the form of an elongated hollow shaft 18 extending through the chamber 14 of the housing 12 and rotatable relative thereto and a drum 20 disposed within the housing chamber 14 and supported about and rotatable with the shaft 18 about a longitudinal rotational axis A of the shaft 18, and an elongated coupling cable 22 for carrying communications elements being disposed in the chamber 14 and interconnecting the stationary housing 12 with the rotatable drum 20. More particularly, the stationary housing 12 of the apparatus 10 has a pair of spaced apart end walls 24 in the form of substantially flat plates stationarily supported in an upright position on a support structure S and a circumferential side wall 26 having a substantially cylindrical configuration disposed between the spaced end walls 24. The spaced end walls 24 define the chamber 14 therebetween while the circumferential side wall 26 defines an outer periphery of the chamber 14. The housing 12 also includes a plurality of fasteners 28, such as bolts and nuts, extending between and interconnecting the spaced end walls 24 and disposed exteriorly of and spaced about the circumferential side wall 26 of the housing 12 so as to retain the circumferential side wall 26 in the substantially cylindrical configuration and a stationary position between the spaced end walls 24 as seen in FIGS. 1–3.

The shaft 18 of the rotatable member 16 extends through the chamber 14 between the end walls 24 and is mounted by a pair of bearings 30 to undergo rotation relative to the end walls 24. The bearings 30 are respectively disposed and supported outside of and by the end walls 24 of the housing 12 where the bearings 30 rotatably support the elongated shaft 18 extending through the end walls 24. The circumferential side wall 26 is radially spaced outwardly from and extends about the rotatable shaft 18 and drum 20.

The coupling cable 22 of the apparatus 10 has a main portion 32 that is generally flat in its cross-sectional configuration as seen in FIGS. 7–10 and terminates in a pair of opposite first and second end portions 34, 36. The first end portion 34 of the coupling cable 22 is secured to the stationary housing 12 while the second end portion 36 of the coupling cable 22 is secured to the rotatable drum 20 such that the second end portion 36 of the coupling cable 22 rotates with the drum 20 and shaft 18 as the first end portion 34 of the coupling cable 22 remains stationary with the stationary housing 12. More particularly, as seen in FIGS. 1, 8 and 9, the side wall 26 of the stationary housing 12 which can be made of a thin sheet of metal has a pair of end portions 26A that are disposed in a facing relationship to one another with the first end portion 34 of the coupling cable 22 secured or clamped between the end portions 26A, such as by using screwed fasteners 38 shown in FIGS. 8 and 9. As seen in FIGS. 3–6, the drum 20 includes a peripheral hub 40 of generally cylindrical configuration having a pair of end segments 40A being turned inwardly toward the rotational axis A of the shaft 18 and drum 20 and disposed in a facing relationship to one another with the second end portion 36 of the coupling cable 22 secured or clamped between the end segments 40A. The drum 20 also includes a plurality of radial stiffening spokes 42 disposed between and interconnecting the hub 40 and the shaft 18 such that the drum 20 undergoes rotation with the shaft 18. The shaft 18 has a hollow interior and a slot 44 in a portion of the shaft 18 located within the drum 20 through which the second end portion 36 of the coupling cable 22 extends into the hollow interior of the shaft 18.

Figure 4:
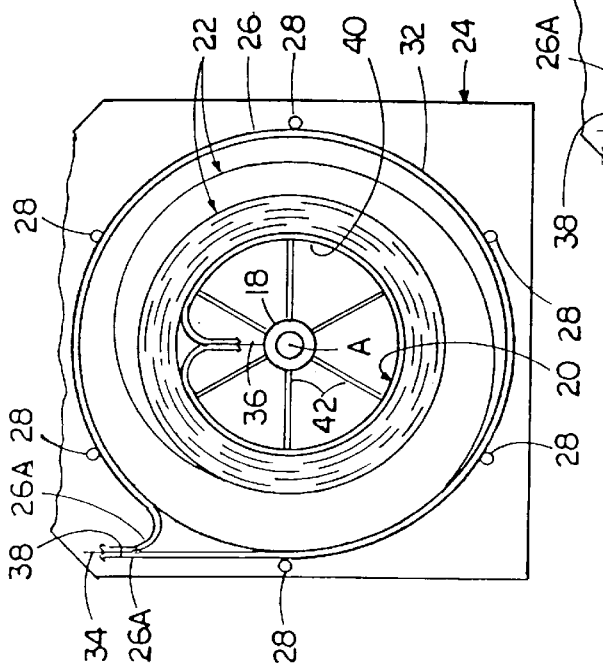
FIG. 4 is an elevational view of the apparatus showing the coupling cable substantially fully wound in a counterclockwise direction on a rotary drum of the apparatus.

By being disposed within the chamber 14 about the rotatable drum 20 and connected between the housing 12 and the drum 20 as described above, the coupling cable 22 is thereby adapted to wind about the rotatable drum 20 away from the circumferential side wall 26 of the housing 12 until reaching a wound condition, as seen in FIGS. 4 and 5, about the drum 20 and to unwind from the rotatable drum 20 toward the circumferential side wall 26 of the housing 12 until reaching an unwound condition, as represented in dashed outline in FIG. 3, as the shaft 18 and drum 20 undergo rotation in clockwise and counterclockwise directions relative to the stationary housing 12. More particularly, the coupling cable 22 preferably has a resiliently flexible flat construction which biases the coupling cable 22 toward the unwound condition such that the coupling cable 22 is adapted to unwind from and wind about the drum 20 as the rotatable shaft 18 and drum 20 undergo either one of clockwise and counterclockwise rotations relative to the housing 12 whereby the shaft 18 and drum 20 can continue rotation in a respective one of clockwise and counterclockwise directions as the coupling cable 22 unwinds from and then winds about the drum 20 before having to reverse direction when the coupling cable 22 reaches the wound condition about the drum 20. Such construction and winding and unwinding of the coupling cable 22 permits the shaft 18 to be rotated about twice the number of revolutions of the shaft 18 before further rotation is prohibited by the coupling cable 22 than if the coupling cable 22 would only wind about the shaft 18 when the shaft 18 was rotated in only one of the opposite clockwise and counterclockwise directions.

Figure 6:
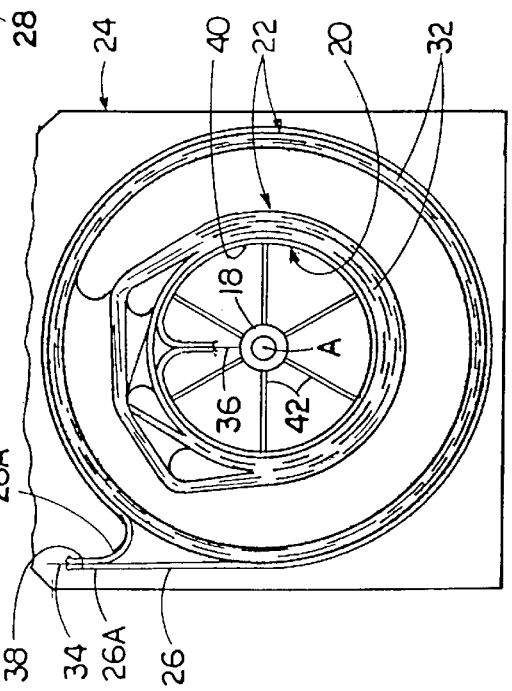
FIG. 6 is an elevational view similar to that of FIGS. 4 and 5 but showing the coupling cable partially wound in both clockwise and counterclockwise directions of the rotary drum of the apparatus.

FIG. 6 depicts the condition of the coupling cable 22 after the shaft 18 has been rotated in the opposite directions several times without the coupling cable 22 reaching either the wound condition or unwound condition relative to the drum 20. In FIG. 6, the coupling cable 22 is shown partially wound in both clockwise and counterclockwise directions about the drum 20 of the apparatus 10.

Referring to FIGS. 1 and 2, the coupling cable 22 may include a plurality of internal communications elements 46 being separable from one another at the first and second opposite end portions 34, 36 of the coupling cable 22 so as to adapt the segments 46 for connection to separate external communications elements. One 24A of the spaced end walls 24 of the stationary housing 12 has a plurality of first connection sites 48 spaced thereon and adapted to connect with respective ones of the internal communications segments 46 of the coupling cable 22 at the first opposite end portion 34 thereof. The apparatus 10 also may include an annular member 50 in the form of a frustoconical shaped transfer wheel mounted to an end portion of the shaft 18 located outside of the housing 12. The annular member 50 has a plurality of second connection sites 52 spaced thereon adapted to connect with respective separated ones of the internal communications segments 46 of the coupling cable 22 at the second opposite end portion 36 thereof. These segments 46 of the coupling cable 22 at its second opposite end portion 36 can, in turn, be incorporated into another cable (not shown) wound about a spool 54 supported on the shaft 18 next to the annular member 50. When used in conjunction with the rotary coupling apparatus 10 as described above, the spool 54 can achieve much greater travel distances with the apparatus 10 using an active length of coupling cable 22 which is only one-half that which might otherwise be required.

Composite Ribbon Coupling Cable

Referring to FIGS. 9 and 10, there is illustrated the coupling cable 22 in the form of a composite ribbon coupling cable of the present invention. The composite ribbon coupling cable 22 basically includes a plurality of elongated internal strengthening elements 56 made of a resilient springy material, the forementioned plurality of elongated internal communications elements 46, an inner jacket 58 of insulative material encapsulating the strengthening elements 56 and communications elements 46 therewithin so as to dispose the encapsulated elements 56, 46 in a substantially common plane providing a substantially flat ribbon configuration, and an outer jacket 60 of resilient wear-resistant protective material encapsulating the inner jacket 58 of insulative material. At least some and preferably all of the elongated strengthening and communications elements 56, 46 are disposed in an alternating spaced apart relation with one another, as best seen in FIG. 10.

More particularly, the strengthening elements 56 preferably are substantially elongated bands of a spring metal while the communications elements 46 have substantially fiber optic cores or copper cores. The inner jacket 58 includes a pair of inner flat layers 58A, 58B of insulative material disposed along and adhered to opposite sides of the alternating strengthening elements 56 and communications elements 46. The outer jacket 60 includes a pair of outer flat layers 60A, 60B of wear-resistant protective material each disposed along and adhered to an outer surface of one of the inner flat layers 58A, 58B of the inner jacket 58 of insulative material.

A significant advantage of the above described construction is that as many elements 46 as reasonably required can be incorporated within the cable 22. The fiber optic and copper cores 46 can readily be separated and extended beyond the first and second connection sites 48, 52 of the cable 22 onto the housing 12 and the shaft 18 and routed to suitable terminations external thereto so as to provide an interconnect facility for associated equipment.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. A composite ribbon coupling cable, comprising:
   (a) a plurality of elongated strengthening elements made of a resilient springy material;
   (b) a plurality of elongated communications elements, at least some of said elongated bands and communications elements being disposed in alternating spaced apart relation with one another;
   (c) an inner jacket of insulative material encapsulating said alternating strengthening elements and communications elements therewithin so as to dispose said encapsulated elements in a substantially common plane providing a substantially flat ribbon configuration, said inner jacket including a pair of inner flat layers of insulative material disposed along and adhered to opposite sides of said alternating strengthening elements and communications elements; and
   (d) an outer jacket of resilient wear-resistant protective material encapsulating said inner jacket of insulative material.

2. The cable as recited in claim 1, wherein said strengthening elements are elongated bands of a spring metal.

3. The cable as recited in claim 2, wherein said communications elements have substantially copper cores.

4. The cable as recited in claim 2, wherein said communications elements have substantially fiber optic cores.

5. The cable as recited in claim 1, wherein said outer jacket includes a pair of outer flat layers of wear-resistant protective material each disposed along and adhered to an outer surface of one of said inner flat layers of said inner jacket of insulative material.

6. The cable as recited in claim 5, wherein said communications elements have substantially copper cores.

7. The cable as recited in claim 5, wherein said strengthening elements are elongated bands of a spring metal.

8. The cable as recited in claim 5, wherein said communications elements have substantially fiber optic cores.

9. The cable as recited in claim 1, wherein said communications elements have substantially fiber optic cores.

10. The cable as recited in claim 1, wherein said communications elements have substantially copper cores.

11. A composite ribbon coupling cable, comprising:
    (a) a plurality of elongated strengthening elements made of a resilient springy material;
    (b) a plurality of elongated communications elements, at least some of said elongated bands and communications elements being disposed in alternating spaced apart relation with one another;
    an inner jacket of insulative material encapsulating said alternating strengthening elements and communications elements therewithin so as to dispose said encapsulated elements in a substantially common plane providing a substantially flat ribbon configuration; and
    (d) an outer jacket of resilient wear-resistant protective material encapsulating said inner jacket of insulative material, said outer jacket including a pair of outer flat layers of wear-resistant protective material disposed along and adhered to opposite sides of said inner jacket of insulative material.

12. The cable as recited in claim 11, wherein said strengthening elements are elongated bands of a spring metal.

13. The cable as recited in claim 12, wherein said communications elements have substantially copper cores.

14. The cable as recited in claim 12, wherein said communications elements have substantially fiber optic cores.

15. A composite ribbon coupling cable, comprising:
   (a) a plurality of elongated strengthening elements made of a resilient springy material, said strengthening elements being elongated bands of a spring metal;
   (b) a plurality of elongated communications elements, at least some of said elongated bands and communications elements being disposed in alternating spaced apart relation with one another;
   (c) an inner jacket of insulative material encapsulating said alternating strengthening elements and communications elements therewithin so as to dispose said encapsulated elements in a substantially common plane providing a substantially flat ribbon configuration; and
   (d) an outer jacket of resilient wear-resistant protective material encapsulating said inner jacket of insulative material.

16. The cable as recited in claim 15, wherein said communications elements have substantially copper cores.

17. The cable as recited in claim 15, wherein said communications elements have substantially fiber optic cores.

* * * * *